United States Patent [19]

Pollock

[11] Patent Number: 5,001,745
[45] Date of Patent: Mar. 19, 1991

[54] METHOD AND APPARATUS FOR PROGRAMMED AUDIO ANNOTATION

[76] Inventor: Charles A. Pollock, 1015 Gayley Ave., #374, Los Angeles, Calif. 90024

[21] Appl. No.: 266,506
[22] Filed: Nov. 3, 1988
[51] Int. Cl.$^5$ ............... H04M 11/00; G10L 5/02
[52] U.S. Cl. ............................. 379/96; 379/88; 381/52; 364/513.5
[58] Field of Search ............ 379/67, 77, 88, 96, 379/97; 381/51, 52; 364/513.5

[56] References Cited

U.S. PATENT DOCUMENTS

| | | | |
|---|---|---|---|
| 4,440,988 | 4/1984 | Heatherington | 379/98 |
| 4,489,438 | 12/1984 | Hughes | 379/88 X |
| 4,523,055 | 6/1985 | Hohl et al. | 379/98 |
| 4,539,435 | 9/1985 | Eckmann | 379/97 |
| 4,581,484 | 4/1986 | Bendig | 379/96 X |
| 4,700,322 | 10/1987 | Benbassat | 379/96 X |
| 4,716,583 | 12/1987 | Groner et al. | 379/88 |

OTHER PUBLICATIONS

Jakatdar, P. et al., "Speech Communication for Personal Computers", *Electrical Communication*, vol. 60, No. 1, 1986, pp. 79–86.

Primary Examiner—Jin F. Ng
Assistant Examiner—Wing F. Chan
Attorney, Agent, or Firm—Blakely, Sokoloff, Taylor & Zafman

[57] ABSTRACT

An apparatus for programmed audio annotation comprises a user's computer system having a display and a modem associated therewith, and a host computer system having an audio synthesizer unit and a memory unit associated therewith. The modem of the user's system and the audio synthesizer unit of the host system are coupled telephonically. An application program is executed on the user's computer system. The application program generates a sequence of screens for display to the user. Associated with each such screen is a digital word that is provided as part of a command to the modem. In response to such command, the modem transmits a dual tone multiple frequency (DTMF) signal which is received by the audio synthesizer unit of the host computer system. The memory unit of the host computer system contains digitized audio data corresponding to audio messages associated with each of the display screens of the application program. The audio synthesizer unit receives the DTMF signal and converts it to a digital address specifying a location in the memory unit. The specified digitized audio data is retrieved and is provided to the audio synthesizer unit which then synthesizes an audio signal. This audio signal is transmitted telephonically to the modem in the user's computer system where the signal is converted to an audible sound by the modem's internal speaker. Accordingly, the user hears the audible sound associated with a visual screen substantially concurrently with the display thereof.

14 Claims, 1 Drawing Sheet

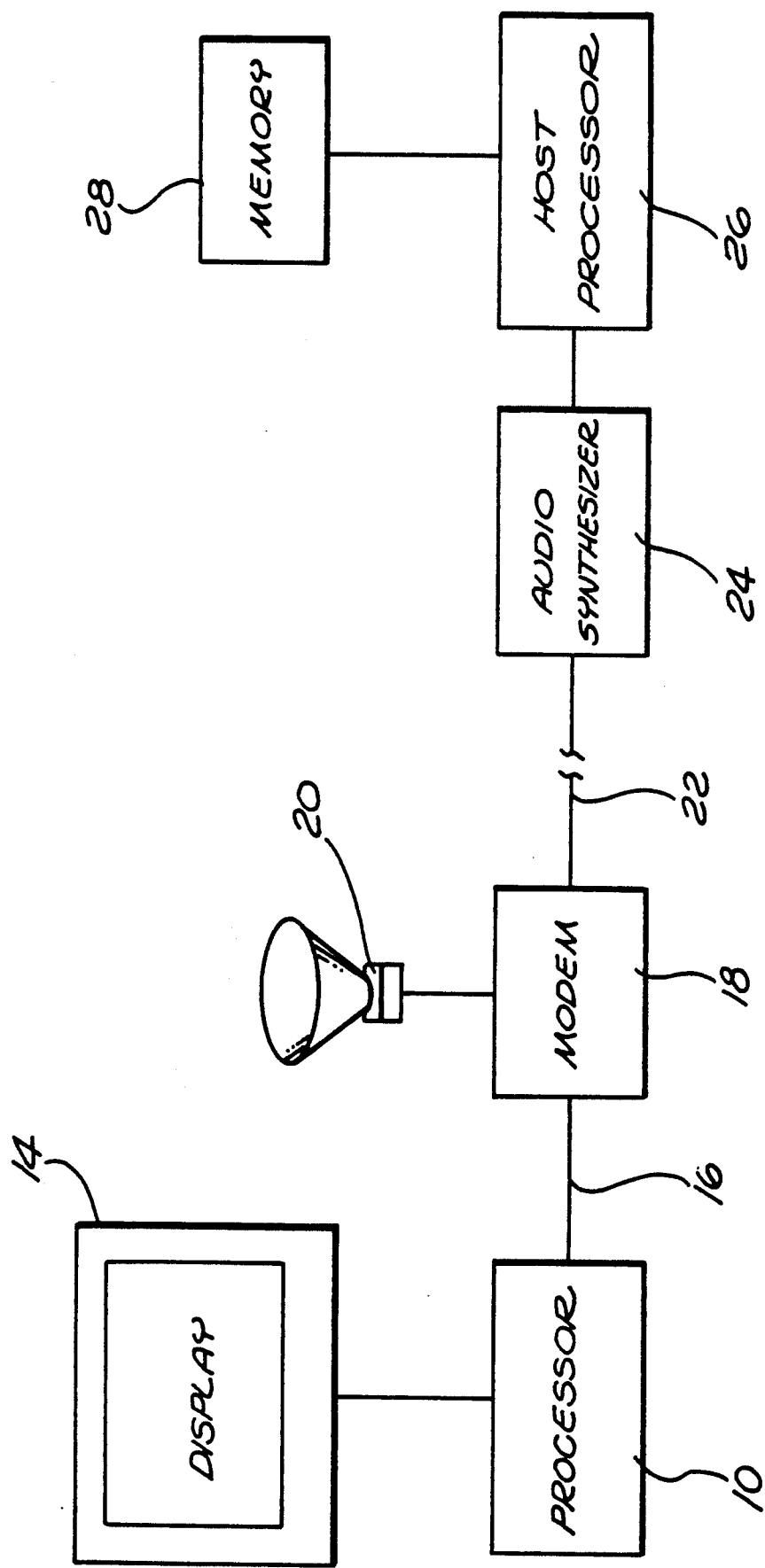

METHOD AND APPARATUS FOR PROGRAMMED AUDIO ANNOTATION

FIELD OF INVENTION

The present invention generally relates to a method for providing audio messages correlated with an interactive computer program and, in particular, to a method whereby such messages are remotely stored and transmitted telephonically to the user system.

BACKGROUND ART

Numerous computer programs have been developed that permit a user to operate the program interactively. Such programs are particularly well suited for educational, instructional and amusement purposes. The effectiveness of such programs can be greatly enhanced by providing sound effects and/or voice messages that are correlated with the visual information presented on the computer screen. It is well known that sound effects and voice messages can be synthesized from digitized data. However, the amount of audio information that can be presented is often severely limited by the amount of memory available. In this regard, it requires approximately 4 kilobytes of memory to store 1 second of audio information to obtain acceptable sound quality. Most personal computer systems, therefore, are capable of storing only a limited amount of audio information.

Systems for synthesizing voice and other audio messages are widely known. Systems for providing a telephonic audio interface are disclosed, for example, in U.S. Pat. No. 4,191,855 issued to Sakai; U.S. Pat. No. 4,489,438 issued to Hughes; U.S. Pat. No. 4,656,651 issued to Evans, et al.; U.S. Pat. No. 4,659,877 issued to Dorsey, et al.; U.S. Pat. No. 4,663,777 issued to Szeto; and U.S. Pat. No. 4,716,583 issued to Groner, et al.

Such telephonic audio interface systems are often employed to provide an interface between a host computer and a user who desires to exchange information with the host system by means of a telephone. A common application for such a system is in the consumer banking industry. Typically, systems of this type provide a synthesized message in response to a user input. However, they do not provide messages that are correlated with the operation of an application program being run on the user's own computer.

As disclosed herein, the present invention provides a system whereby audio messages corresponding to visual information presented by a computer program are retrieved from a host computer and made audible to the local user such that it appears to the user as if the audio messages are being generated directly by the user's own computer.

SUMMARY OF THE INVENTION

The present invention provides an apparatus for programmed audio annotation comprising a first computer system having a display and a modem associated therewith, and a second computer system having an audio synthesizer unit and a memory unit associated therewith. The modem of the first system and the audio synthesizer unit of the second system are coupled telephonically.

An application program is executed on the first (user) computer system. The application program generates a sequence of screens for display to the user. Associated with each such screen is a digital word that is provided as part of a command to the modem. In response to such command, the modem transmits a dual tone multiple frequency (DTMF) signal which is received by the audio synthesizer unit of the second computer system.

The memory unit of the second computer system contains digitized audio data corresponding to audio messages associated with each of the display screens of the application program. The audio synthesizer unit receives the DTMF signal and converts it to a digital address specifying a location in the memory unit. The specified digitized audio data is retrieved and is provided to the audio synthesizer unit which then synthesizes an audio signal. This audio signal is transmitted telephonically to the modem in the first computer system where the signal is converted to an audible sound by the modem's internal speaker. Accordingly, the user hears the audible sound associated with a visual screen substantially concurrently with the display thereof.

BRIEF DESCRIPTION OF THE DRAWINGS

The FIGURE is a block diagram of a system according to the present invention.

DETAILED DESCRIPTION OF THE PREFERRED EMBODIMENT

A method and apparatus for programmed audio annotation is disclosed. In the following description, for purposes of explanation and not limitation, specific numbers, system configurations, equipment selections, communications protocols, etc. are set forth in order to provide a thorough understanding of the present invention. However, it will be apparent to one skilled in the art that the present invention may be practiced without these specific details. In other instances, well known circuits and devices are shown in block diagram form in order not to obscure the present invention with unnecessary detail.

Referring to the figure, a user system comprises processor 10 and display 14. Processor 10 may be any type of personal computer or other device capable of executing an application program as hereinafter described.

Associated with processor 10 is modem 18, which may be a plug-in device within processor 10 or may be a free standing unit. In either case, modem 18 communicates with processor 10 via serial interface 16. Modem 18 may be any one of the commercially available modems as are well known in the art, but is preferably one that employs the same communications protocol as modems manufactured by Hayes Microcomputer Products, Inc. of Norcross, Ga. Modem 18 preferably includes an internal speaker 20, however, speaker 20 may be remotely located if desired.

A host computer system comprises processor 26, audio synthesis unit 24 and memory unit 28. Host processor 26 may also be a personal computer or it may be a special purpose processor dedicated to the audio synthesis task as described below.

Audio synthesizer 24 is preferably a commercially available plug-in device commonly known as a "voice card". Such a device is capable of receiving digitized voice or other sound data and generating therefrom an analog signal which, when applied to a speaker, produces the synthesized sound.

Modem 18 and audio synthesizer unit 24 are interconnected by a standard telephone line 22. Synthesizer 24 not only converts digitized audio data into analog audio signals, but is also capable of receiving dual tone multiple frequency (DTMF) signals on telephone line 22 and converting such signals into digital data. Consequently, two way communication is established between modem 18 and synthesizer unit 24 with digital data being sent from modem 18 to synthesizer 24 and audio signals being sent in the reverse direction.

In operation, a user employs processor 10 to execute an application program The present invention is particularly useful in connection with application programs of an interactive nature, such as educational, instructional and amusement programs. A program with which the present invention is used preferably comprises a sequence of "screens" to be displayed on display 14. Such screens may consist of graphics, text or a combination of the two. Successive screens may contain the same or different data.

The present invention provides a user with voice or other audio messages that are correlated with visual information presented on display 14. Audio messages associated with the screens of the application program are prerecorded. Each screen may have one or more unique audio messages associated therewith. Also, a particular audio message may be associated with one or more screens. As previously explained, digital representations of audio messages consume large amounts of memory space and, thus, it may not be convenient to store such audio messages in user processor 10. Memory unit 28 which is coupled to host processor 26, employs a high capacity memory medium such as a hard disk, optical disk, or the like. Large quantities of digitized audio data ca thus be conveniently stored in unit 28.

Host processor 26 may be dedicated to the audio message task discussed herein or it may be made available to perform other tasks with appropriate multitasking software. It is also possible for processor 26 to support a plurality of user systems with the addition of appropriate multiplexing hardware (not shown) that would permit telephonic connection of one or more synthesizer units 24 with a plurality of modems 18. In this fashion, a single processor 26 and memory device 28 can provide interactive audio communication with a large number of user systems.

At the beginning of an application program session, processor 10 issues a conventional telecommunications command to modem 18 to establish communications with host processor 26. Once the telephone connection between the modem and the host system is established, modem 18 remains in a command mode.

Processor 26 is programmed to support the application program being run on user processor 10. Processor 26 may be programmed to support any number of application programs, dependent only on the storage capacity of memory unit 28 and the provision of appropriate screen/message identifiers as explained below.

As successive screens of an application program are displayed on display 14 under the control of processor 10, an audio message command is sent to modem 18 containing a digital word associated with each screen. Such an audio message command causes modem 18 to convert the digital word provided by processor 10 into a corresponding DTMF signal. The format of the audio message command depends upon the particular modem unit employed. In the case of a modem using the message protocol established by Hayes Microcomputer Products, Inc., an audio message command preferably comprises the following sequence of modem commands:

ATMODTxxM2;(CR)

where:

AT alerts the modem that a modem command follows;

MO disables the internal modem speaker;

DT instructs the modem to output a DTMF signal (as opposed to a pulse signal);

xx is a unique identifier of a screen and its corresponding audio message;

M2 enables the internal modem speaker;

; instructs the modem not to attempt to establish a communications link, i.e. not to expect a carrier tone in reply;

(CR) is a carriage return which instructs the modem to process the foregoing command sequence.

When the modem processes the command sequence described above, the screen/message identifier (xx) is converted to a DTMF signal and sent out on telephone line 22. Preferably, the internal speaker is first disabled so that the user will not hear the DTMF signal as it is generated and applied to telephone line 22. Such extraneous sounds would detract from the perception of audio continuity and correlation with the application program.

Synthesizer unit 24, which is also coupled to telephone line 22, receives the DTMF signal generated by modem 18. Synthesizer unit 24 converts the DTMF signal into a digital word identifying the particular audio message requested by the user system. This digital word is sent to processor 26 which then retrieves the corresponding digitized message from memory unit 28. This digitized message is then applied to synthesizer unit 2 which synthesizes an analog audio signal corresponding to the digitized data. The audio signal is applied to telephone line 22 and is received by modem 18 in the same manner as if it were a voice message spoken into an ordinary telephone set. This message is applied to the internal modem speaker (enabled by the command sequence described above) and is heard by the user. Therefore, the user hears an audio message concurrently with display of the corresponding visual screen on display 14.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

I claim:

1. An audio annotation system comprising:

first processor means for executing an application program and having display means for displaying a sequence of visual screens generated by said application program, said first processor means generating a digital command corresponding to one of said visual screens substantially concurrently with display thereof;

first converter means coupled to said first processor means for receiving said digital command and for generating a first audio signal in response thereto;

second converter means coupled to said first converter means for receiving said first audio signal and for generating an address in response thereto;

memory means for storing digitized audio data, a predetermined subset of which corresponds to each of said visual screens; and second processor means coupled to said memory means and said second converter means for receiving said address and for retrieving a subset of said digitized audio data from said memory means at a memory location specified by said address;

wherein said second converter means includes means for converting said digitized audio data to a second audio signal; and wherein said first converter means includes means for converting said second audio signal to an audible sound;

whereby said audible sound occurs substantially concurrently with display of said one of said visual screens.

2. The audio annotation system of claim 1 wherein said audio signal is a DTMF signal.

3. The audio annotation system of claim 1 wherein said first and second converter means are coupled telephonically.

4. The audio annotation system of claim 1 wherein said first processor means is a personal computer.

5. The audio annotation system of claim 1 wherein said second processor means is a personal computer.

6. The audio annotation system of claim 1 wherein said first converter means is a modem.

7. A method of providing audio annotation of a computer program, said computer program executing in a user system to generate a sequence of visual screens for display to a user on a display unit, said method comprising the steps of:

(a) generating a digital command corresponding to one of said visual screens substantially concurrently with display thereof on said display unit;

(b) converting said digital command to a first audio signal;

(c) sending said first audio signal to a host system;

(d) converting said first audio signal to an address;

(e) retrieving digitized audio data from a memory device at a memory location specified by said address;

(f) converting said digitized audio data to a second audio signal;

(g) sending said second audio signal to said user system; and (h) converting said second audio signal to an audible sound;

whereby said user hears said audible sound substantially concurrently with display of said one of said visual screens.

8. The method of claim 7 wherein said first audio signal is a DTMF signal.

9. The method of claim 7 wherein said host system is remote from said user system.

10. The method of claim 9 wherein said host and user systems are coupled telephonically.

11. The method of claim 7 wherein said user system is a personal computer.

12. The method of claim 7 wherein said host system is a personal computer.

13. The method of claim 7 wherein said second audio signal is a synthesized human voice.

14. The method of claim 7 wherein said user system includes modem for converting said digital command to said first audio signal and for converting said second audio signal to said audible sound.

* * * * *

UNITED STATES PATENT AND TRADEMARK OFFICE
CERTIFICATE OF CORRECTION

PATENT NO. : 5,001,745
DATED : 3/19/91
INVENTOR(S) : Pollock

It is certified that error appears in the above-identified patent and that said Letters Patent is hereby corrected as shown below:

| | | |
|---|---|---|
| col. 03, line 30 | delete "ca" | insert --can-- |
| col. 04, line 32 | delete "2" | insert --24-- |
| col. 5, line 14 | after "said" | insert --first-- |

Signed and Sealed this

Thirteenth Day of July, 1993

Attest:

MICHAEL K. KIRK

Attesting Officer

Acting Commissioner of Patents and Trademarks